US005137254A

United States Patent [19]

Aardema et al.

[11] Patent Number: 5,137,254

[45] Date of Patent: Aug. 11, 1992

[54] PRESSURE COMPENSATED FLOW AMPLIFYING POPPET VALVE

[75] Inventors: James A. Aardema, Joliet; Andrew H. Nippert, Peoria; Lawrence F. Schexnayder, Joliet, all of Ill.

[73] Assignee: Caterpillar Inc., Peoria, Ill.

[21] Appl. No.: 754,092

[22] Filed: Sep. 3, 1991

[51] Int. Cl.5 .......................................... F16K 31/363

[52] U.S. Cl. ................................ 251/35; 137/596.14; 251/44

[58] Field of Search ................ 251/35, 44; 137/596.14

[56] References Cited

U.S. PATENT DOCUMENTS

| | | | |
|---|---|---|---|
| 3,175,800 | 3/1965 | Donner et al. | 251/35 |
| 4,535,809 | 8/1985 | Andersson | 135/596.14 |
| 4,593,715 | 6/1986 | Stich et al. | 251/35 X |
| 4,846,216 | 7/1989 | Raymond | 137/516.27 |
| 4,945,723 | 8/1990 | Izumi et al. | 60/426 |
| 5,005,358 | 4/1991 | Hirata et al. | 60/426 |

*Primary Examiner*—Gerald A. Michalsky
*Attorney, Agent, or Firm*—John W. Grant

[57] ABSTRACT

Flow amplifying poppet valves are useful in hydraulic circuits requiring low leakage when the circuit is in a load holding condition. Pressure compensation of the known flow amplifying poppet valves has not been totally successful and thus, the output flow varies somewhat with changing pressure drops across the poppet valve. The subject pressure compensated flow amplifying poppet valve utilizes a pressure compensating valve and a compensating orifice disposed in a compensating flow path disposed in parallel with a valve device for controllably regulating fluid flow through a flow regulating passage. Fluid flow through the compensating flow path is restricted by the orifice to a flow rate substantially equal to the amount of fluid that can flow through a flow control slot in a valve element at a closed position of the valve element. The addition of the compensating flow path and the compensating valve greatly increases the pressure compensating capability of the pressure compensated flow amplifying poppet valve so that the fluid flow through the poppet valve remains substantially constant for a given position of the valve means regardless of changing load conditions.

24 Claims, 5 Drawing Sheets

PRESSURE COMPENSATED FLOW AMPLIFYING POPPET VALVE

DESCRIPTION

1. Technical Field

This invention relates generally to poppet type hydraulic control valves and more particularly to a pressure compensated flow amplifying poppet valve.

2. Background Art

One type of low leakage hydraulic control valves is commonly referred to as a poppet valve. Such poppet valves typically include a cylindrical poppet valve element having a reduced diameter end seated against a valve seat in the valve. Fluid flow from an inlet port through the valve to an outlet port is controlled by controllably moving the valve element off the seat. A basic type of poppet valve has a throttling slot through the valve element to communicate the inlet port pressure to a control chamber at the back side of the valve element. The fluid pressure in the control chamber exerts a closing force on the valve element holding it against the valve seat. A spring is also generally used to hold the valve element against the valve seat when the inlet, control and outlet pressures are all equal.

One method of controlling the opening position of the poppet valve element is to communicate the control chamber with the outlet port through a variable regulating orifice of a pilot valve. The variable regulating orifice is normally closed so that fluid pressure in the control chamber equals the inlet pressure and the poppet valve element is urged against the valve seat by the pressure in the control chamber. Opening of the poppet valve element is achieved by controllably opening the variable regulating orifice to communicate the control chamber with the outlet port. This creates a pressure drop through the throttling slot in the valve element such that the inlet pressure urges the valve element off the valve seat as the control pressure drops below the balance pressure. The degree of opening of the valve element is subsequently controlled by controlling the flow through the variable regulating orifice of the pilot valve to regulate the flow through the throttling slot. This method of control is described in U.S. Pat. No. 4,535,809. One of the problems with that design is that the flow through the poppet valve increases and decreases with increasing and decreasing pressure drops respectively between the inlet and outlet ports. The pressure drop between the inlet and outlet port changes with changing loads and/or pump pressure due to other circuits of the hydraulic system.

Another method of controlling the position of the poppet valve element also described in U.S. Pat. No. 4,535,809 includes the addition of a pressure reducing valve in series with the variable regulating orifice described in the preceding paragraph. The pressure reducing valve maintains a constant pressure drop across the variable regulating orifice. The throttling slot of that design is always open to some degree to allow control fluid flow through the slot to pressurize the control chamber and urge the valve element against the seat. The amount of opening through the slot when the valve element is seated against the valve seat depends upon machining tolerances. However, due to this control flow, the outlet flow decreases with increasing pressure drop between the inlet and outlet ports.

The present invention is directed to overcoming one or more of the problems as set forth above.

DISCLOSURE OF THE INVENTION

In one aspect of the present invention, a pressure compensated flow amplifying poppet valve comprises an inlet port, an outlet port, a cylindrical bore, and an elongate valve element having a spool portion slidably disposed in the cylindrical bore defining a control chamber. The valve element is movable between a closed position at which the inlet port is blocked from the outlet port and an open position to establish a main flow regulating orifice between the inlet and outlet ports. The valve element includes a variable orifice between the inlet port and the control chamber. A flow regulating passage means is provided for communicating the control chamber with the outlet port. A valve means controllably regulates the fluid flow through the flow regulating passage means. A means is provided for establishing a restricted compensating flow path from the control chamber to the outlet port parallel to the flow regulating passage means.

It is desirable to have the flow amplifying poppet valves pressure compensated so that the output flow of the valve remains substantially constant for a given opening of a pilot valve regardless of changes in the load pressure or the input pressure.

BEST MODE FOR CARRYING OUT THE INVENTION

Figure 1:
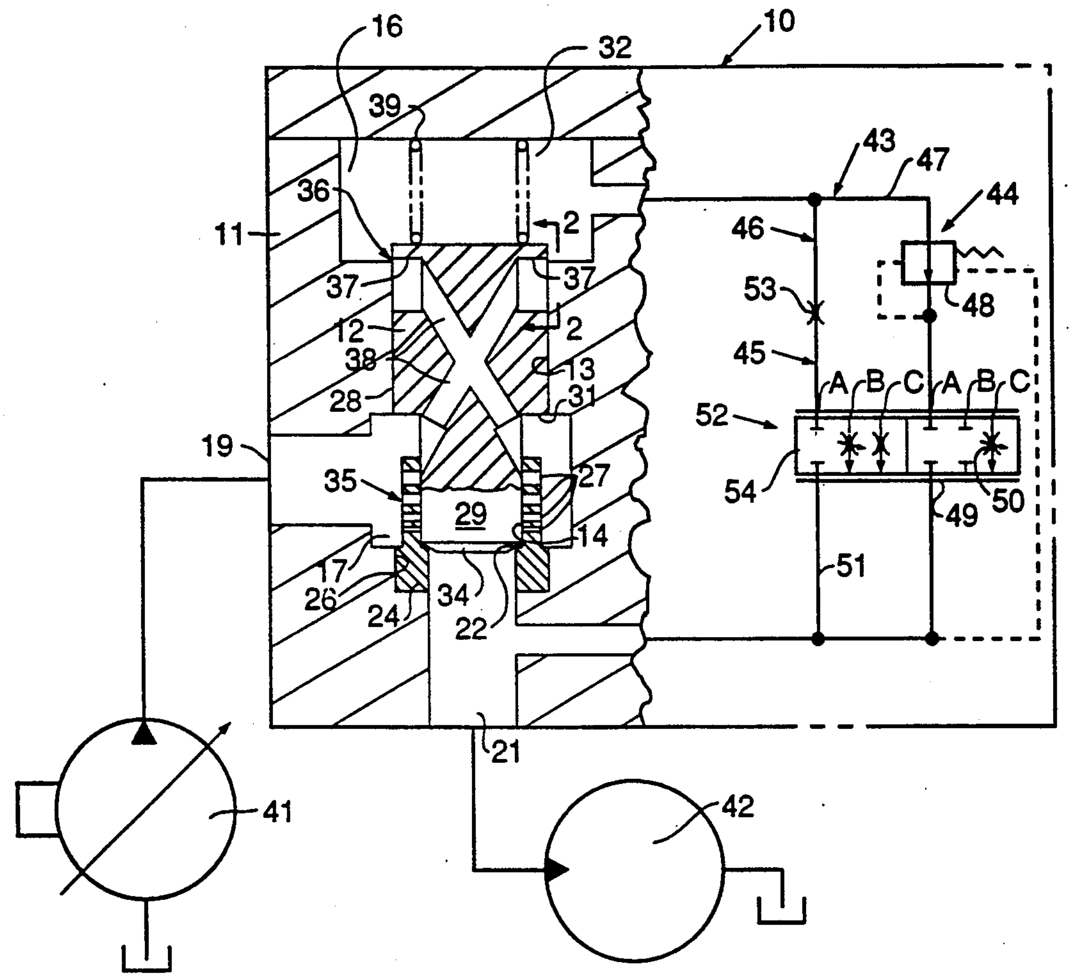
FIG. 1 is a schematic illustration of one embodiment of the present invention with portions shown in cross-section for illustrative convenience.

A pressure compensated flow amplifying poppet valve is generally indicated by the reference numeral 10 and includes a composite valve body 11 and a valve element 12. The body includes a pair of concentric cylindrical bores 13,14, a pair of axially spaced annuluses 16,17, an inlet port 19 in communication with the annulus 17, an outlet port 21 in communication with the cylindrical bore 14, and a value seat 22 between the cylindrical bore 14 and the outlet port 21. The cylindrical bore 14 is formed in an annular sleeve 24 suitably seated in a bore 26. A plurality of flow modulating ports 27 extend through the sleeve 24 to communicate the annulus 17 with the cylindrical bore 14.

Figure 2:
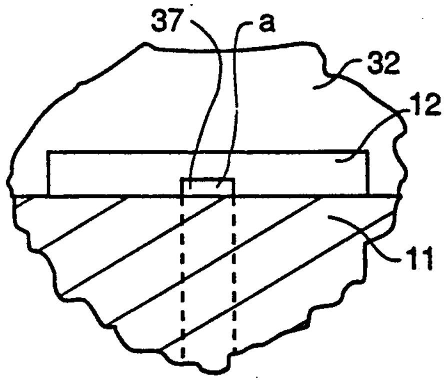
FIG. 2 is a somewhat enlarge sectional view taken along line 2—2 of FIG. 1.

The valve element 12 has a pair of concentric spool portions 28,29 slidably disposed in the cylindrical bores 13,14, respectively and define an annular reaction surface 31 therebetween. A control chamber 32 is defined by the annulus 16 and the end of the spool portion 28. The area of the end of the spool portion 28 is substantially larger than area of the surface 31. The spool portion 29 terminates at a conical end portion 34 and cooperates with the ports 27 to provide a main flow regulating orifice 35. A pair of variable area flow control orifices 36 are provided in the spool portion 28 to communicate the inlet port 19 with the control chamber 32. The orifices 36 are in the form of a pair of axially extending rectangular slots 37 connected to the inlet port 19 through a pair of diagonally extending passages 38. As more clearly shown in FIG. 2, a minimum flow area "a" of the slots 37 is always open to continuously communicate the inlet port 19 with the control chamber 32. A light-weight spring 39 disposed between the valve element 12 and the body 11 resiliently urges the conical end portion 34 into sealing engagement with the valve seat 22.

A pressure compensated variable displacement pump 41 is connected to the inlet port 19 and a motor 42 is connected to the outlet port 21.

The poppet valve 10 also includes a flow regulating passage means 43 communicating the control chamber 32 with the outlet port 21, a valve means 44 for controllably regulating the fluid flow through the passage means 43, and means 45 for establishing a restricted compensating flow path 46 from the control chamber 32 to the outlet port 21 parallel to the passage means 43. The passage means 43 includes a regulating passage 47 connected to and extending between the control chamber 32 and the outlet port 21. The valve means 44 includes a pressure reducing valve 48 and a flow regulating valve 49 serially disposed in the regulating passage 47. The flow regulating valve 49 is movable between a closed position blocking communication through the regulating passage 47 and an infinitely variable open position establishing a variable regulating orifice 50 for regulating fluid flow through the regulating passage 47. The pressure reducing valve 48 maintains a substantially constant pressure drop across the regulating valve 49 at its open position.

The flow path 46 includes a compensating passage 51 connected to the passage 47 on opposite sides of the valves 48 and 49. The establishing means 45 includes a means 52 for controlling fluid flow through the passage 51 of the flow path 46. The regulating means 52 includes a compensating orifice 53 and a compensating valve 54 serially disposed in the passage 51. The compensating valve 54 is movable between a closed position and an open position to modulatably control fluid flow through the passage 51. The compensating orifice 53 establishes a maximum flow area through the passage 51 at the fully open position of the compensating valve 54.

In this embodiment the pressure regulating valve 48 and the compensating valve 54 are shown combined into a single valve movable between positions A, B, and C. Such movement can be by any convenient means such as pilot operation, electrical solenoid operation or mechanical operation. Alternatively, the flow regulating valve and compensating valve 54 may be separate valves which can be sequentially operated. Also, the orifice 53 may be incorporated within the compensating valve 54 and be established by the maximum opening area of the compensating valve.

Other embodiments of a pressure compensating flow amplifying poppet valve 10 of the present invention are disclosed in FIGS. 3–6. It is noted that the same reference numerals of the first embodiment are used to designate similarly constructed counterpart elements of these embodiments.

Figure 3:
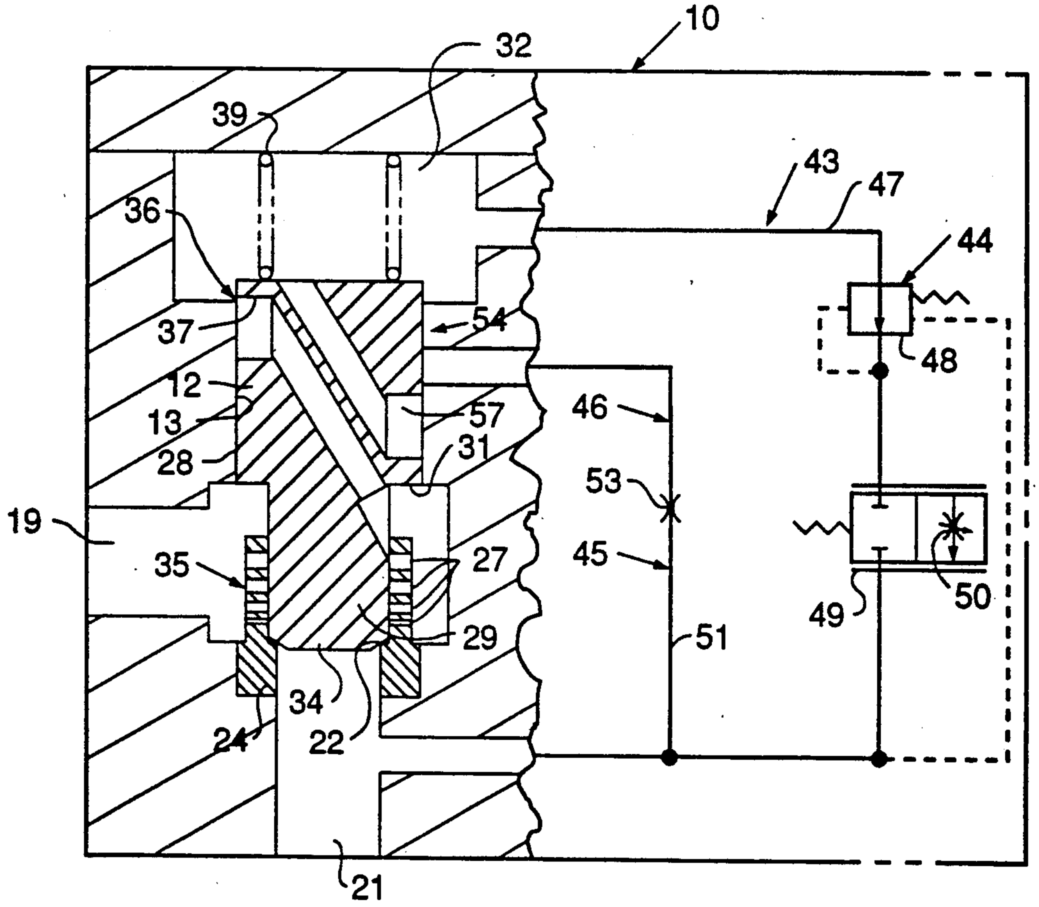
FIGS. 3 through 6 are schematic illustrations of other embodiments of the present invention.

In the embodiment of FIG. 3, the compensating passage 51 connects the cylindrical bore 13 with the outlet port 21 and the compensating valve 54 is formed by a slot 57 provided in the spool portion 28 of the valve element 12. The slot 57 is in continuous communication with the control chamber 32. Communication through the compensating passage 51 is blocked by the spool portion 28 when the end portion 34 is seated against the valve seat 22.

Figure 4:
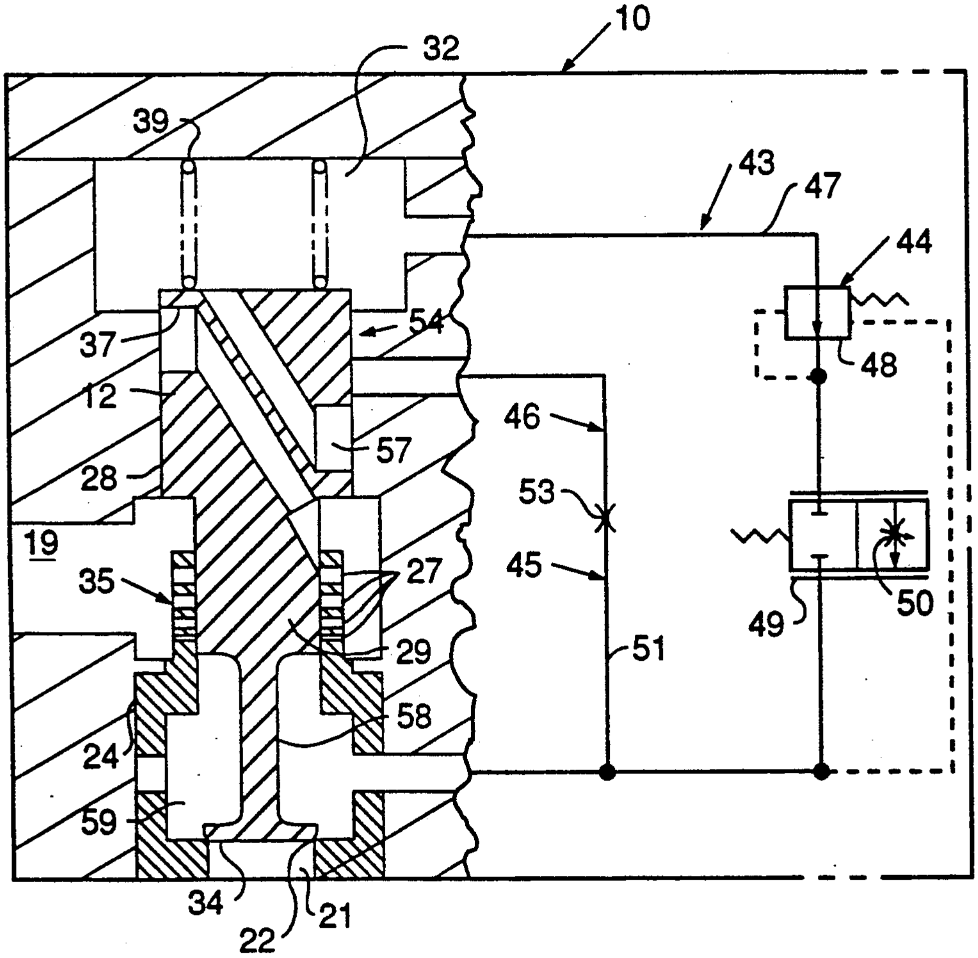

The embodiment of FIG. 4 is similar to the embodiment of FIG. 3 with the exception that the establishing means 45 includes having the end portion 34 of the valve element 12 axially separated from the spool portion 29 by a reduced diameter portion 58, the valve seat 22 axially spaced from the ports 27 by an annular chamber 59 formed in the sleeve 24, and the compensating passage 51 connecting the bore 13 with the annulus 59.

Figure 5:
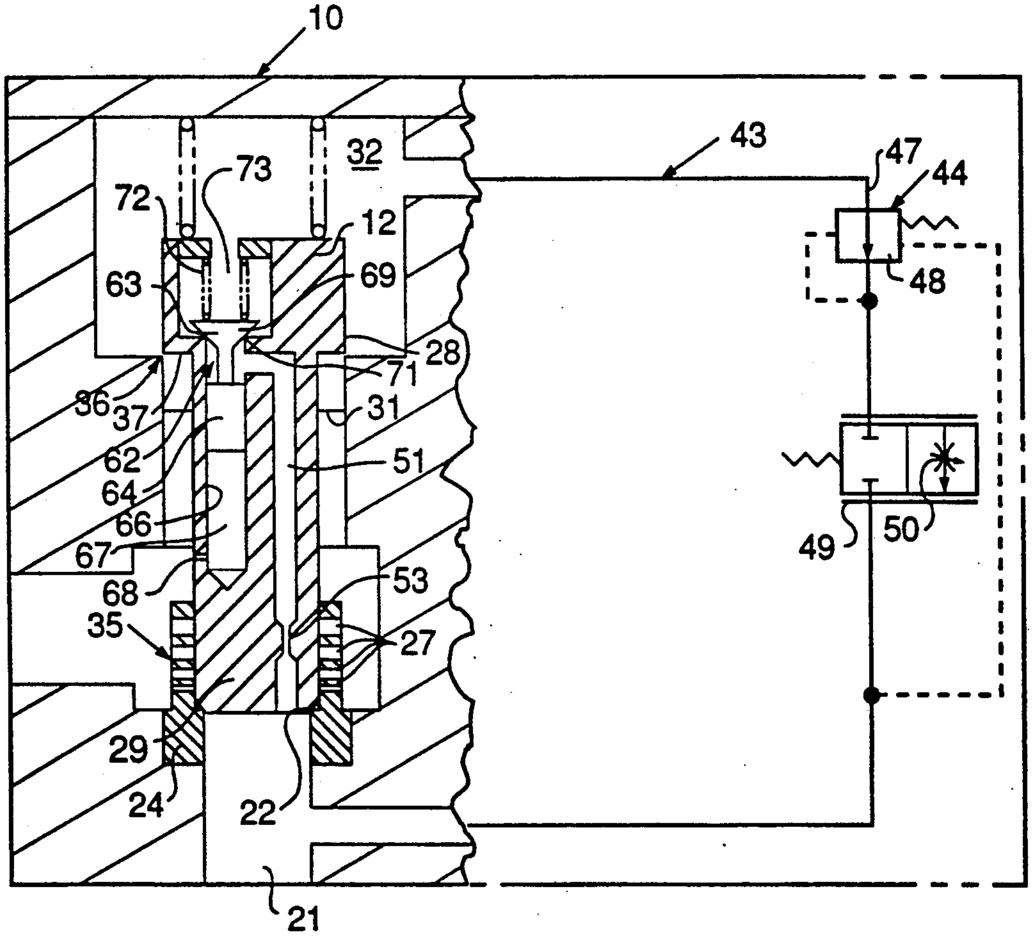

In the embodiment of FIG. 5, the compensating passage 51, the orifice 53, and a compensating valve 62 are disposed within the valve element 12. More specifically, the compensating valve 62 includes a poppet valve 63 having a piston 64 slidably disposed in an axial bore 66 and defines an actuating chamber 67 in communication with the inlet port 19 through an opening 68. A conical valve portion 69 of the poppet valve 63 is biased against a valve seat 71 by a spring 72 disposed in a chamber 73 open to the control chamber 32. The compensating passage 51 connects the bore 66 adjacent the valve seat 71 with the outlet port 21.

Figure 6:
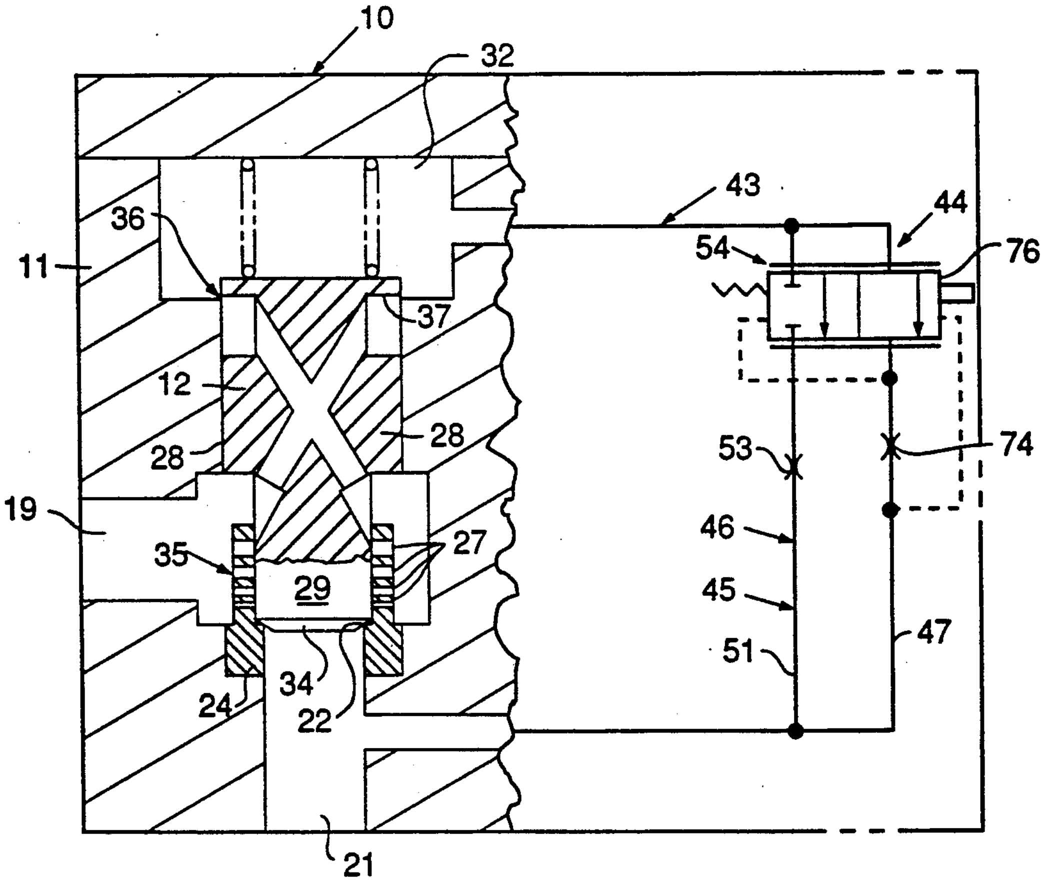

In the embodiment of FIG. 6, the valve means 44 includes a fixed orifice 74 disposed in the regulating passage 47 and a pressure regulating valve 76 also disposed in the regulating passage 47 upstream of the orifice 74 to controllably vary the pressure drop across the fixed orifice 74. The compensating valve 54 is built into the regulating valve 76 and is disposed in the passage 51 of the compensating flow path 46 similar to the embodiment of FIG. 1.

INDUSTRIAL APPLICABILITY

With respect to the embodiment of FIG. 1, when both the regulating valve 49 and compensating valve 54 are in the closed position represented by the letter "A" as shown in the FIG. 1, fluid from the inlet port 19 passes through the passages 38 and the slots 37 into the control chamber 32. Since there is no fluid flow through the passages 47 and 51, the fluid pressure in the control chamber 32 is substantially equal to the fluid pressure in the inlet port 19. With the area of the valve element 12 subjected to the fluid pressure in the control chamber 32 being greater than the area of the reaction surface 31, the valve element 12 is urged downwardly so that the end portion 34 remains sealingly engaged with the valve seat 22. If the fluid pressures in the inlet port 19 and the outlet port 21 are equal, the spring 39 holds the valve element in the sealing position.

In the use of the embodiment of FIG. 1 of the present invention, actuation of the poppet valve 10 is initiated by initially controllably moving the compensating valve 54 from the "A" position to the "B" position. This controllably establishes fluid flow from the inlet port 19 through the passages 38, the aggregate open area "a" of the slots 37, the control chamber 32, the passage 51, the orifice 53, and the compensating valve 54 to the outlet port 21. Movement of the compensating valve 54 between the "A" and "B" positions modulatably controls the fluid passing through the passage 51 while the orifice 53 generally limits the amount of fluid that can pass through the passage 51 of the flow path 46. In this embodiment, flow through the regulating valve 49 at the "B" position is still blocked. The fluid flow through the passage 51 is fairly low and generally does not generate a pressure drop sufficient to cause the valve element 12 to move upwardly to unseat the end portion 34 from the valve seat 22. Such low flow is referred to as impending flow.

Upon further movement of the compensating valve 54 and the regulating valve 49 from the "B" position to the "C" position, fluid flow through the flow path 46 does not increase due to the size of the orifice 53. However, movement of the regulating valve 49 between the "B" and "C" positions opens the regulating orifice 50 and establishes fluid flow through the passage 47 between the control chamber 32 and the outlet port 21 sufficient to create a pressure drop between the inlet port 19 and the control chamber 32. At some small regulating flow through the regulating orifice 50 of the regulating valve 47, the valve element 12 moves upwardly and lifts the end portion 34 from the valve seat 22 but does not uncover any of the modulating ports 27 in the sleeve 24. With increasing regulating flow through the regulating orifice 50 and increasing movement of the valve element 12, the spool portion 29 begins uncovering the ports 27 establishing fluid flow through the main flow regulating orifice 35 from the inlet port 19 to the outlet port 21. The upward movement of the valve element 12 and thus the degree of opening of the ports 27 is determined by the flow between the inlet port 19 and the control chamber 32 which in turn is modulatably controlled by the degree of opening of the flow regulating valve 49. At a steady state position of the regulating valve 49, the flow through the slots 37 equals the aggregate flow through the passages 47 and 51. Also the flow through the main orifice 35 is a proportional amount greater than the flow through the regulating orifice 50.

The pressure reducing valve 48 functions in its usual manner to maintain a constant pressure drop across the regulating valve 49. The combination of the compensating orifice 53 and the compensating valve 54 in the flow path 46 disposed in parallel with the pressure reducing valve 48 and the regulating valve 54 makes the poppet valve substantially fully compensated. Thus, the fluid flow through the inlet and outlet ports remains substantially constant at a given setting of the regulating valve 49 regardless of pressure differentials between the inlet and outlet ports 19, 21.

In general, to make the poppet valve fully compensated, the size of the compensating orifice 53 will be slightly less than the aggregate area "a" of the slots 37 that is always open. However, the size relationship between the orifice 53 and the aggregate area "a" can be varied to compensate for closing flow forces acting on the valve element 12 and the amount of fluid leaking between the valve element and the bore 13. Depending on the magnitude of the flow forces and the bore leakage, the size of the compensating orifice may be slightly less than, equal to, or slightly greater than the open area "a" of the slots. In actuality the size of the compensating orifice is preferably selected so that the end portion 34 remains seated when the compensating valve is at the "B" or "C" position and the fluid flow through the passage 51 is limited by the compensating orifice.

Alternatively, the outlet flow from the outlet port 21 can be purposely made to increase or decrease with increasing pressure drop between the inlet and outlet ports by changing the size of the compensating orifice 53 relative to the area "a" of the control slots 37 which is always open.

In the use of the embodiment of FIG. 3, actuation of the poppet valve 10 to the open position is initiated by opening the flow regulating orifice 50 of the regulating valve 49. At some small regulated flow through the regulating orifice 50, the valve element 12 moves upwardly to unseat the end portion 34 from the seat 22 and the slot 57 communicates with the compensating passage 51. A portion of the impending flow passes through the compensating passage 51 and the rest passes through the regulating passage 47. Increasing the regulating flow through the regulating orifice causes the valve element 12 to continue moving upwardly. At a predetermined position of the valve element 12, the fixed orifice 53 limits the fluid flow through the passage 51. Shortly thereafter, the spool portion 29 begins uncovering the modulating ports 27 thereby allowing fluid flow from the inlet port 19 to pass through the ports 27 to the outlet port 21.

Operation of the embodiment of FIG. 4 is essentially the same as the FIG. 3 embodiment. However, with this embodiment, the compensating passage 51 is positively blocked from the outlet port 21 when the end portion 34 is seated against the valve seat 22. Thus, any leakage flow past the spool portion 28 is positively blocked from the outlet port 21. The initial upward movement of the valve element 12 unseats the end portion 34 thereby immediately establishing communication between the compensating passage 51 and the outlet port 21.

Referring to the embodiment of FIG. 5 with the regulating valve 49 in the blocked position and the end portion 34 seated against the valve seat 22, the pressure in the control chamber 32 equals the pressure in the inlet port 19. The poppet valve 63 is thus urged to the closed position shown by the spring 72. When the regulating orifice 50 of the regulating valve 49 is initially opened to initiate regulating fluid flow through the regulating passage 47, the pressure in the control chamber 32 decreases due to the pressure drop across the slots 37. At some small pressure drop, the poppet valve 63 opens allowing fluid flow from the control chamber 32 through the compensating passage 51 and the orifice 53 to the outlet port 21. At some predetermined pressure drop, the poppet valve 63 will become fully open. The compensating orifice 53 limits the amount of fluid that can pass through the passage 51 at the open position of the compensating valve 53. After the maximum flow rate through the passage 51 has been reached and with some additional regulating flow, the valve element 12 moves upwardly unseating the end portion 34 from the valve seat 22 and eventually the spool portion 29 will uncover the ports 27 to initiate the main flow between the inlet port 19 through the ports 27 to the outlet port 21.

Operation of the embodiment of FIG. 6 is initiated by moving the combined pressure regulating valve 76 and the compensating valve 54 simultaneously. The initial movement of the compensating valve 54 permits fluid to flow through the compensating passage 51 from the control chamber 32 to the outlet port 21. At some predetermined point, the fluid flow rate through the passage 51 matches the size of the fixed orifice 53 so that further opening of the compensating valve 54 has no effect on fluid flow through the passage 51. Shortly after that occurs, the pressure regulating valve 76 opens to allow fluid flow through the regulating passage 47 to create a pressure drop between the inlet port 19 and the control chamber 32. As previously described, with increasing flow through regulating passage 47, the valve element 12 initially moves upwardly sufficient to unseat the end portion 34 from the valve seat 22 with the spool portion 29 subsequently uncovering the ports 27 to initiate fluid flow from the inlet port 19 to the outlet port 21. The pressure regulating valve 76 is operative to controllably vary the pressure drop across the fixed orifice 74 in proportion to the input force applied to the regulating valve for moving it to the open position.

In view of the foregoing, it is readily apparent that the structure of the present invention provides an improved pressure compensating flow amplifying poppet valve which makes the poppet valve substantially fully pressure compensated. This is accomplished by providing a compensating valve and compensating orifice in a compensating passage disposed in parallel with the valve means in the regulating flow passage such that the small flow through the compensating passage essentially equals the amount of flow that can pass through the slots in the main valve element before the main flow is established between the inlet and outlet ports.

Other aspects, objects, and advantages of this invention can be obtained from a study of the drawings, the disclosure, and the appended claims.

We claim:

1. A pressure compensated flow amplifying poppet valve comprising:

an inlet port;

an outlet port;

an annular valve seat disposed between the inlet and outlet ports;

a cylindrical bore;

an elongate valve element having an end portion and a spool portion slidably disposed in the bore defining a control chamber, the valve element being movable between a closed position at which the end portion sealingly engages the valve seat blocking the inlet port from the outlet port and an open position at which a main flow regulating orifice is established between the inlet and outlet ports, the spool portion including a variable orifice between the inlet port and the control chamber, and wherein one of the valve seat and the end portion has a conical shape;

flow regulating passage means communicating the control chamber with the outlet port;

valve means for controllably regulating the fluid flow through the flow regulating passage means; and means for establishing a restricted compensating flow path from the control chamber to the outlet port parallel to the flow regulating passage means, the establishing means including a compensating orifice disposed in the compensating flow path and a compensating valve movable between a variable open position for controlling fluid flow through the compensating flow path and a closed position blocking fluid flow through the compensating flow path.

2. The flow amplifying poppet valve of claim 1 wherein the compensating orifice establishes a maximum flow area to limit fluid flow through the compensating flow path at the open position of the pressure compensating valve.

3. The flow amplifying poppet valve of claim 2 including a second cylindrical bore coaxial with the first bore and a plurality of ports communicating the inlet port with the second bore, and the valve element includes a second spool portion slidably disposed in the second bore with the second spool portion and the ports cooperating to define the main flow regulating orifice when the valve element is at the open position.

4. The flow amplifying poppet valve of claim 3 wherein the variable orifice includes an axially extending slot disposed in the second spool portion and being in continuous communication with the inlet port.

5. The flow amplifying poppet valve of claim 4 wherein the ports are axially spaced from the valve seat and movement of the valve element to the open position establishes communication therethrough.

6. The flow amplifying poppet valve of claim 5 wherein the axially extending slot has a minimum flow area which is always open to the control chamber and the compensating orifice has an area substantially equal to the minimum flow area.

7. The flow amplifying poppet valve of claim 5 wherein the valve means includes a flow regulating valve disposed in the flow regulating passage means and movable between a closed position blocking communication through the flow regulating passage means and an infinitely variable open position establishing variable communication through the flow regulating passage means, and a pressure reducing valve disposed in the flow regulating passage means in series flow relationship with the flow regulating valve for maintaining a substantially constant pressure drop across the flow regulating valve at its open position.

8. The flow amplifying poppet valve of claim 7 wherein the compensating flow path includes a compensating passage communicating the control chamber with the outlet port, the compensating orifice and the compensating valve being disposed in the compensating passage.

9. The flow amplifying poppet valve of claim 8 wherein movement of the flow regulating valve and the pressure compensating valve is sequential wherein the compensating valve opens first and reaches a position to establish maximum fluid flow through the compensating passage before the flow regulating valve opens.

10. The flow amplifying poppet valve of claim 5 wherein the compensating flow path includes a compensating passage communicating the first bore with the outlet port and the compensating valve includes the first spool portion and a fluid flow regulating passage in the first spool portion in continuous communication with the control chamber.

11. The flow amplifying poppet valve of claim 10 wherein the regulating passage is blocked from the compensating passage when the valve element is in the closed position, and in communication with the compensating passage prior to the valve element reaching its open position.

12. The flow amplifying poppet valve of claim 11 wherein the valve means includes a flow regulating valve disposed in the flow regulating passage means and movable between a closed position blocking communication through the flow regulating passage means and an infinitely variable open position establishing variable communication through the flow regulating passage means, and a pressure reducing valve disposed in the flow regulating passage means in series flow relationship with the flow regulating valve for maintaining a substantial constant pressure drop across the flow regulating valve at its open position.

13. The flow amplifying poppet valve of claim 5 wherein the compensating flow path includes means defining an annular chamber blocked from the outlet port at the closed position of the valve element and in communication with the outlet port at the open position of the valve element, and a compensating passage communicating the first bore with the annular chamber, and the compensating valve includes the first spool portion and a fluid flow regulating passage in the first spool portion in continuous communication with the control chamber.

14. The flow amplifying poppet valve of claim 13 wherein the regulating passage is blocked from the compensating passage when the valve element is in the closed position, and in communication with the compensating passage prior to the valve element reaching its open position.

15. The flow amplifying poppet valve of claim 14 wherein the valve means includes a flow regulating valve disposed in the flow regulating passage means and movable between a closed position blocking communication through the flow regulating passage means and an infinitely variable open position establishing variable communication through the flow regulating passage means, and a pressure reducing valve disposed in the flow regulating passage means in series flow relationship with the flow regulating valve for maintaining a substantial constant pressure drop across the flow regulating valve at its open position.

16. The flow amplifying poppet valve of claim 5 wherein the compensating flow path includes a compensating passage in the valve element and being in continuous communication with the outlet port, and the compensating valve includes a bore in the valve element and a poppet valve disposed in the bore of the valve element, the poppet valve blocking communication between the control chamber and the compensating passage at its closed position and establishing communication between the control chamber and the compensating passage at its open position.

17. The flow amplifying poppet valve of claim 16 including a valve seat adjacent the bore in the valve element and a conical portion in sealing engagement with the valve seat at the closed position of the compensating valve and a spring resiliently urging the compensating valve to the closed position.

18. The flow amplifying poppet valve of claim 17 wherein the poppet valve includes a piston slidably disposed in the bore of the valve element defining an actuating chamber, and an opening communicating the inlet port with the actuating chamber.

19. The flow amplifying poppet valve of claim 5 wherein the valve means includes a fixed orifice disposed in the flow regulating passage means and a pressure regulating valve disposed in series with the fixed orifice and operative to maintain a variable pressure drop across the fixed orifice proportional to an input force applied to the pressure regulating valve.

20. A pressure compensated flow amplifying poppet valve comprising:

an inlet port;

an outlet port;

a cylindrical bore;

an elongate valve element having a spool portion slidably disposed in the bore defining a control chamber, the valve element being movable between a closed position at which the inlet port is blocked from the outlet port and an open position at which a main flow regulating orifice is established between the inlet and outlet ports, the spool portion including a variable orifice between the inlet port and the control chamber;

flow regulating passage means communicating the control chamber with the outlet port;

valve means for controllably regulating the fluid flow through the flow regulating passage means, the valve means including a flow regulating valve disposed in the flow regulating passage means and movable between a closed position blocking communication through the flow regulating passage means and an infinitely variable open position establishing variable communication through the flow regulating passage means, and a pressure reducing valve disposed in the flow regulating passage means in series flow relationship with the flow regulating valve for maintaining a substantially with the flow regulating valve flow regulating valve at its open position; and means for establishing a restricted compensating flow path from the control chamber to the outlet port parallel to the flow regulating passage means.

21. The flow amplifying poppet valve of claim 20 wherein the establishing means includes a compensating orifice disposed in the compensating flow path and a compensating valve movable between a variable open position to control fluid flow through the compensating flow path and a closed position blocking fluid flow through the compensating flow path.

22. The flow amplifying poppet valve of claim 4 wherein the compensating orifice establishes a maximum flow area to limit fluid flow through the compensating flow path at the open position of the pressure compensating valve.

23. The flow amplifying poppet valve of claim 4 wherein the compensating flow path includes a compensating passage communicating the control chamber with the outlet port, the compensating orifice and the compensating valve being disposed in the compensating passage.

24. The flow amplifying poppet valve of claim 23 wherein movement of the flow regulating valve and the pressure compensating valve is sequential wherein the compensating valve opens first and reaches a position to establish maximum fluid flow through the compensating passage before the flow regulating valve opens.

* * * * *

UNITED STATES PATENT AND TRADEMARK OFFICE

CERTIFICATE OF CORRECTION

PATENT NO. : 5,137,254

DATED : August 11, 1992

INVENTOR(S) : James A. Aardema, Andrew H. Nippert and Lawrence F. Schexnayder

It is certified that error appears in the above-identified patent and that said Letters Patent is hereby corrected as shown below:

In claim 20, column 10, line 25, delete "with the flow regulating valve" and insert --constant pressure drop across the--.

In claim 22, column 10, line 37, delete "4" and insert --21--.

In claim 23, column 10, line 42, delete "4" and insert --21--.

Signed and Sealed this

Seventh Day of September, 1993

Attest:

BRUCE LEHMAN

*Attesting Officer* — *Commissioner of Patents and Trademarks*